United States Patent [19]

LeGrand et al.

[11] Patent Number: 4,647,493
[45] Date of Patent: Mar. 3, 1987

[54] PUNCTURE RESISTANT LAMINATE

[75] Inventors: Donald G. LeGrand, Burnt Hills; William V. Olszewski, Stillwater, both of N.Y.

[73] Assignee: General Electric Company, Pittsfield, Mass.

[21] Appl. No.: 639,712

[22] Filed: Aug. 13, 1984

[51] Int. Cl.$^4$ .................. B32B 27/36; B32B 17/06
[52] U.S. Cl. .................. 428/215; 428/412; 428/429; 428/442; 428/451; 428/415; 428/475.5; 428/425.6; 428/448; 428/480
[58] Field of Search ........... 428/215, 412, 429, 442, 428/448, 451

[56] References Cited

U.S. PATENT DOCUMENTS

| | | | |
|---|---|---|---|
| 4,123,588 | 10/1978 | Molari, Jr. | 428/412 |
| 4,312,903 | 1/1982 | Molari | 428/34 |
| 4,328,277 | 5/1982 | Molari | 428/215 |
| 4,404,257 | 9/1983 | Olson | 428/412 |
| 4,514,464 | 4/1985 | Gomez | 428/412 |

*Primary Examiner*—P. C. Ives
*Attorney, Agent, or Firm*—John W. Harbour; William F. Mufatti; Edward K. Welch, II

[57] ABSTRACT

The present invention provides an improved penetration resistant laminate comprising: a plurality of internal and forward penetration resistant thermoplastic resinous laminae of from about 100 mils to about 250 mils in thickness; a back polycarbonate lamina opposite the direction of impact or penetration from about 30 to about 220 mils in thickness; a plurality of compatible adhesive interlayers to bond the laminae; and an internal lamina of glass from about 100 mils to about 250 mils in thickness removed from said back polycarbonate lamina by at least one interposed thermoplastic resinous lamina.

12 Claims, No Drawings

PUNCTURE RESISTANT LAMINATE

This invention relates to improved transparent penetration-resistant laminates and methods to produce the same. More particularly, this invention relates to transparent bullet-resistant laminates having a back lamina of polycarbonate, an internal lamina of glass removed from said back lamina of polycarbonate by at least one intervening lamina, and a plurality of resinous laminae and compatible adhesive interlayers. Such laminates, when compared to bullet-resistant laminates presently on the market have greatly superior stopping power at an equivalent size and weight.

BACKGROUND OF THE INVENTION

Transparent bullet-resistant laminates having glass and plastic laminae are well known. Early such laminates, U.S. Pat. No. 2,991,209, contained laminae of a "hard resin material", such as, polymethyl methacrylate, in addition to laminae of glass and were able to stop a greater number of bullets than the conventional glass bullet-resistant panels of the time having twice the weight.

Recent efforts of the bullet resistant laminate industry have likewise been directed towards more stopping power at reduced weight with a growing emphasis placed on thickness and cost. These efforts have resulted in laminates having an increased number of plies, reduced glass content, and increased shock resistant resin content. It has become normal practice in the industry in constructing such laminates to utilize glass or relatively hard solid resinous materials as the impact shock receiving layers while utilizing polycarbonate as a back or inner or downstream layer or that presented to the person or object being protected.

The polycarbonates have become a common shock resistant resin in bullet resistant laminates. U.S. Pat. No. 3,624,238 discloses the use of a polycarbonate lamina as the middle layer of a symmetrical and predominantly glass bullet resistant structure. This particular laminate, by today's standard, has insufficient penetration resistance, is subject to spalling, is too heavy, and is unable to withstand multiple penetrations.

U.S. Pat. No. 3,666,614 discloses laminated assemblies for use as structural windshields in motor vehicles. These laminated assemblies are glass-polycarbonate laminates, for example, two ply laminates having a forward facing lamina of glass and a back lamina of polycarbonate bonded with an adhesive interlayer of ethylene-vinyl acetate. Optionally, primers may be used to increase adhesion of the laminae and a mar-resistant coating may be applied to the external face of the polycarbonate lamina. Embodiments of this invention suffer from, among other deficiencies, a tendency of the back polycarbonate lamina to spall upon impact of an object with the front glass lamina and an insufficient level of penetration resistance to projectiles.

U.S. Pat. No. 4,328,277, assigned to the same assignee as the present invention, discloses a bullet resistant laminate having laminae of a solid resinous material such as polycarbonate or glass, adhesive interlayers of a compatible adhesive such as polydiorganosiloxane-polycarbonate block copolymer, and a back mar-resistant polycarbonate lamina of controlled thickness opposite the direction of impact or shock. The disclosed embodiments of this reference provide excellent penetration resistance for their weight and thickness. However, in some situations, it may be desirable to provide greater penetration resistance, in order to stop very high speed projectiles especially if such can be done without substantial increases in weight or thickness.

U.S. Pat. No. 4,123,588, assigned to the same assignee as the present invention, discloses a bullet resistant laminate having at least one lamina of acrylic polymer, a lamina or laminae of glass or a solid resinous material such as polycarbonate, and at least one polydiorganosiloxane-polycarbonate block copolymer adhesive interlayer. As above, the preferred embodiments of this invention provide excellent penetration resistance for their size and thickness, but in some situations, greater penetration resistance is necessary in order to stop very high speed projectiles.

Thus, reasonably lightweight and thin laminates exist having excellent multi-projectile stopping power without spall, but these laminates are most effective against bullet sized projectiles having medium range velocities on the order of less than 600 m/sec. These laminates are substantially less effective against such projectiles at very high speeds, that is speeds on the order of 600 m/sec. and greater.

Therefore, it is an object of the present invention to produce an impact or shock resistant laminate having improved penetration resistance without substantial weight gain or increased thickness.

It is another object of the present invention to produce an impact or shock resistant laminate capable of withstanding multiple penetrations by bullet size projectiles having velocities in excess of 600 m/sec.

DESCRIPTION OF THE INVENTION

Briefly, according to the present invention, it has been found that the penetration resistance of a transparent thermoplastic resinous laminate having a back polycarbonate lamina of controlled thickness is greatly increased by the addition of an internal lamina of strengthened glass which is removed from the back lamina of polycarbonate by at least one intervening thermoplastic resinous lamina preferably of polymethylacrylate. Although not desiring to be bound to this theory, it is believed that the penetrating projectile, upon striking the internal glass lamina shatters the glass, incorporates into its bulk much of the thus shattered material, and therefore greatly increases the surface area which is presented to the subsequent thermoplastic resinous laminae for energy dissipation. Regardless of the theory explaining the observation, it has been found that laminates having the above construction have substantially improved penetration resistance when compared to such laminates having no glass lamina or to such glass laminates having an externally situated glass lamina.

Any of the usual polycarbonate thermoplastic resins can be used as laminae for the present invention including but not limited to those described in U.S. Pat. Nos. 3,161,615; 3,220,973; 3,312,659; 3,312,660; 3,313,777; 3,666,614, among others, all of which are included herein by reference.

Without a limitation to the claims, where a polycarbonate layer without further description or designation is mentioned herein, it is bisphenol-A or 2,2-bis(4-hydroxyphenol)propane polycarbonate. Particularly, those manufactured under the trademark LEXAN® by the General Electric Company.

Suitable glass for use in the laminates of the present invention includes all types of glass commonly used in the preparation of glass lamina containing laminates. Thus, the glass might be common plate glass, thermally tempered glass, chemically tempered glass, or other appropriate type.

Preferably, the glass is a thermally tempered or chemically tempered type. An example of the chemically tempered glass is that which has been treated chemically with salts in an ion-exchange type process to give a higher tensile and flexural strength glass. A glass treating process of this type is disclosed in U.S. Pat. No. 3,395,998. Tempered glasses are available commercially and are marketed by such companies, as Pittsburgh Plate Glass Company of Pittsburgh, Pa. (thermal tempered glass) and Corning Glass Works, of Elmira, N.Y. (chemically tempered glass).

The glass may be transparent, translucent, opaque, and/or tinted, as the application may require. The glass may also contain or have on its surface salts and/or metal oxides that will respond to or conduct an electric current and thus allow such glass to be heated by electric current.

Polyacrylate or polymethacrylate resins are preferred laminae in the present invention. Suitable acrylic resins herein embrace those polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylic and methacrylic monomers with lesser molar portions of other ethylenically or diethylenically unsaturated compounds are also included within the term acrylic resin as it appears herein. The polymerization of the monomeric acrylates and methacrylates to provide the polyacrylate resins useful in the practice of the invention may be accomplished by any of the well known polymerization techniques. A preferred acrylic resin is poly(methylmethacrylate).

Other thermoplastic resinous materials which may be used as laminae include ABS plastics based on combining acrylonitrile, butadiene and styrene; acetal homopolymers; acetal copolymers produced by polymerization of trioxane and ethylene oxide; acrylics; epoxy resins; nylons, those prepared from a diamine and a diacid and those prepared from an amino acid or amino acid derivative; phenolics; polycarbonates; phenylene oxide based resins such as polyphenylene oxide and blends of polyphenylene oxide and styrene resins; polyaryl ethers; polyesters; polyethylenes; polyphenylene sulfides; polypropylene; polysulfones; polyurethanes; silicones; ethylene polymers such as ethyl vinyl acetates; conductive plastics; and ordered aromatic copolymers, etc. These solid resinous materials can be formed into sheets. Other materials which may be included within the scope of this invention are described in U.S. Pat. No. 3,662,440, which is incorporated herein by reference.

The back polycarbonate lamina or any other sensitive resinous lamina of the laminate may have a protective coating on either an internal or external face or both. The primary function of the protective coating on an external face is scratch and mar resistance. To perform this function, generally any suitable scratch and mar resistant coating will fall within the invention. However, in the cases where the protective coating is to be applied to the external surface of the back polycarbonate lamina, it should function so that cracks of the protective coat do not propagate into the polycarbonate. Thus, it should be relatively more brittle that the underlying polycarbonate layer and have a thickness of from about 0.05 to about 1 mil. Usually the coating is a crosslinkable, thermosettable polymer.

Often, the same protective coating used on an external face for scratch and mar resistance may be used on an internally bonded face of the sensitive resinous lamina to protect such from incompatible or aggressive adhesive interlayers such as those containing incompatible plasticizers. Such coatings on an internal face of the back polycarbonate or other sensitive resinous laminae are cross-linked and must provide for good adhesion with the interlayer. Examples of such coatings suitable for this second function are the crosslinked acrylic or methacrylic coatings and the melamine coatings.

The laminae of the present invention are bonded together by use of a compatible adhesive interlayer. Any conventional adhesive may be used between the laminae including the polyvinylbutyrals, ethylene terpolymers, epoxies, polyurethanes, silicones, acrylates or methacrylates, and ethylene acrylic acids, among others. The thickness of the preferred adhesive interlayer is from about 5 mil. and about 60 mil. The interlayer in contact with any polycarbonate or other sensitive resinous ply and most specifically the polycarbonate backply must provide not only good adhesion but also must be chemically compatible with the sensitive resin, particularly as to the plasticizer used. The preferred interlayer for contact with the polycarbonate laminae is a polydiorganosiloxane-polycarbonate block copolymer which contains no plasticizers.

The polydiorganosiloxane-polycarbonate block copolymers can be expressed by the average formula

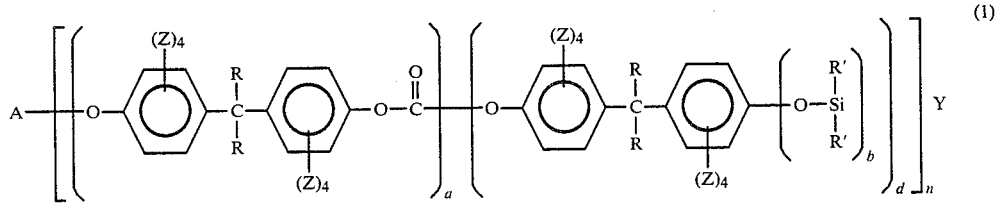

and thereafter phosenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula 4 can be made by conventional procedures such as by the controlled hydrolysis of a diorganodihalosilane, for example, dimethyldichlorosilane as taught in Patnode, U.S. Pat. No. 2,381,366 and Hyde U.S. Pat. Nos. 2,629,726 and 2,902,507; where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, Y is

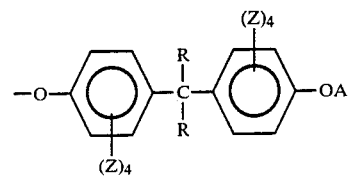

(2)

A is a member selected from the class of hydrogen and

(3)

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals preferably $C_{(1-8)}$ radicals represented by R of Formula 1 are aryl radicals and halogenated aryl radicals such as phenyl, chlorophenyl, xylyl, tolyl, etc.; aralkyl radicals such a phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc; R can be all the same radical or any two or more of the aforementioned radicals, while R is preferably methyl, R' includes all radicals included by R above except hydrogen, where R' can also be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula 1 can be produced by reacting at temperatures in the range of 0° C. to 100° C., preferably 20° C. to 50° C., and in the presence of an acid acceptor, a mixture of a halogen chain-stopped polydiorganosiloxane having the formula

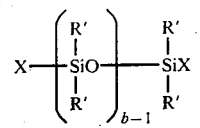

(4)

and a dihydric phenol having the formula

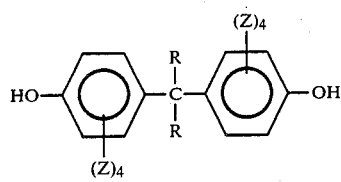

(5)

and thereafter phosgenating said reaction product until the resulting copolymer achieves a maximum intrinsic viscosity, where R, R', Z and b are as defined above, and X is a halogen radical., preferably chloro.

The halogen chain-stopped polydiorganosiloxanes of Formula 4 can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 5 are, for example, 2,2-bis(4-hydroxyphenol)-propane, (bisphenol-A); 2,4'-dihyroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc. Mixtures can also be used. Others will occur to those skilled in the art.

The copolymers of the present invention essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. Nos. 3,189,662 and 3,821,325 included herein by reference and can be used either alone as such or in conjunction with well known modifiers to provide particular desired characteristics.

Illustrative of the commercially available block copolymer solid interlayers is General Electric LR-3320. This material has a specific gravity of 1.12, tensile strength of 2500 to 3900 psi, an elongation of 230 to 430, a tear strength (Die C) of 400 lbs/in., and a brittleness temperature below −76° F. and a heat deflection temperature (10 mils under 66 psi Load) of 160° F.

Another such commercially available block copolymer, specifically General Electric LR-5530, has a specific gravity of 1.07, a tensile strength of 2200 to 2500 psi, an elongation of 500–700%, a tear(die C) of 200 lbs/in., a brittleness temperature below −76° F. and a heat deflection temperature (66 psi) of 130° F.

Where desirable, adhesion promoting primers can be used to promote adhesion between the laminae and the adhesive interlayer. Useful as the principle ingredient of such primers are the silanes such as vinyl alkoxy silanes, aminoalkyalkoxy silanes, alkoxy silanes, silyl peroxides, and amino alkoxy silanes. These materials are well known and many are described in U.S. Pat. No. 3,666,614 and elsewhere. Preferred primers for glass to adhesive interlayer bonds are those containing an aminoalkyl(polyalkoxysilane) such as alpha-aminopropyltriethoxy silane as described in U.S. Pat. No. 4,040,882 or those containing an aminoalkyl (polyaryloxysiloxane) such as described in U.S. Pat. No. 4,204,026 both of which are incorporated herein by reference. Preferred primers for polycarbonate to adhesive interlayer bonds are those containing solutions of the above polydiorganosiloxane-polycarbonate block copolymers More specifically, the present invention includes impact shock or penetration resistant laminates having at least four impact receiving laminae at least two of which are any thermoplastic resinous laminae and have thicknesses from about 100 mils to about 250 mils, one of which is a back polycarbonate lamina opposite the direction of impact or shock having a thickness of from about 30 mils to about 220 mils, and one of which is an internal lamina of glass separated from the back polycarbonate lamina by at least one lamina of solid resinous material.

Specifically, the internal glass lamina must not be an exposed lamina, that is, it must be bonded to other laminae on each of its two sides. Of course, it would be obvious to replace this single glass lamina with a succession of thin glass laminae to form an internal glass composite, preferably no greater in combined thickness than 250 mil and under the condition that this succession of glass laminae must not terminate with an externally situated glass lamina. Thus, it is to be understood that the term internal glass lamina or its equivalent will refer both to a single sheet of glass or to a multi-layer glass composite.

It is preferred, that the laminate be symmetrical about the internal glass lamina, and have outer, exposed laminae of polycarbonate. Further, the glass lamina is preferably bonded on each of its two sides to laminae of polyacrylate and especially laminae of polymethacrylate. Therefore, a preferred embodiment of the present invention might be a symmetrical laminate having laminae of polycarbonate/polymethacrylate/glass/polymethacrylate/polycarbonate in the thicknesses described above bonded by adhesive interlayers of polydiorganosiloxane-polycarbonate block copolymer.

The laminate may be bonded by any common technique known in the art. Of course the physical parameters of the technique chosen to bond the laminate must be compatible with the materials chosen for its construction. Common bonding techniques include the use of an air or oil autoclave and nylon vaccuum bags.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

This example illustrates a prior art laminate over which the present invention represents an improvement. There was laminated in an air autoclave and nylon bag at a temperature of 130°–135° C., a pressure of 6–8 atm and a hold time of 30 minutes a laminate symmetrical in make-up and dimensions about a central adhesive interlayer consisting of an external Lexan polycarbonate sheet 118 mils thick bonded by 17 mils of LR-3320 polydiorganosiloxane-polycarbonate block copolymer to a 495 mils thick Lexan polycarbonate sheet bonded in turn to the central adhesive interlayer of 17 mils of LR-3320 polydiorganosiloxane-polycarbonate block copolymer. When a bullet was fired at the surface of this laminate from a .222 rifle with a muzzle velocity of approximately 975 m/s at 22° C. and 15m distance there was complete bullet penetration.

EXAMPLE 2

Example 1 was repeated to produce and test a laminate symmetrical in make-up and dimensions about a central adhesive interlayer consisting of a Lexan polycarbonate sheet 118 mils thick bonded by 17 mils of LR-3320 polydiorganosiloxane-polycarbonate block copolymer to a 500 mils thick polymethylmethacrylate sheet bonded in turn to the central adhesive interlayer of 17 mils of LR 3320 polydiorganosiloxane-polycarbonate block copolymer. This laminate was also completely penetrated by the testing procedure of Example 1.

EXAMPLE 3

This example illustrates an embodiment of the present invention. Example 1 was repeated to produce and test a laminate symmetrical in make-up and dimensions about a central lamina of Vycor chemically tempered glass produced by Corning Glass Works of Elmira, N.Y. This laminate consists of a Lexan polycarbonate sheet 220 mils thick bonded by 17 mils of LR-3320 polydiorganosiloxane-polycarbonate block copolymer to a 250 mils thick polymethylmethacrylate sheet which is in turn bonded by 17 mils of LR-3320 polydiorganosiloxane-polycarbonate block copolymer to the central lamina of 250 mil Vycor glass which is primed with an alcoholic solution of alpha-aminopropyltriethoxysilane. When a bullet was fired at this laminate under the conditions of Example 1, it did not penetrate to the back lamina of polycarbonate. Upon shattering the central glass lamina, the bullet was stopped in the rear lamina of polymethyl methacrylate.

This laminate having a modest increase in size and weight provides greatly superior stopping power thereby demonstrating the criticality of using an internal glass lamina in providing size and weight efficient laminates able to withstand the impact of high velocity projectiles. Thus, are laminates of superior penetration resistance produced.

While there have been described what are considered to be the preferred embodiments of this invention, it will be understood that the practice of this invention is not limited to the resins and coatings described in the specific examples but that various modifications may be made therein without departing from the scope of the invention as it is defined in the appended claims.

What is claimed is:

1. An improved penetration resistant laminate exhibiting improved resistance to penetration comprised of at least four laminae, one of which is an internal glass lamina, comprising: at least one front thermoplastic resinous lamina of from about 100 to about 250 mils in thickness facing the direction of impact; a back polycarbonate lamina opposite the direction of impact or penetration having a controlled thickness of from about 30 to about 220 mils; and an internal lamina of glass from about 100 to about 250 mils in thickness disposed between said front and said back laminae and removed from said back polycarbonate lamina by at least one thermoplastic resinous lamina interposed between said glass lamina and said back polycarbonate lamina; said laminae being bonded together by means of compatible adhesive interlayers interposed therebetween.

2. A laminate according to claim 1 wherein at least the back polycarbonate lamina and the internal lamina of strengthened glass are bonded to the adjacent laminae with an adhesive interlayer of polydiorganosiloxane-polycarbonate block copolymer.

3. A laminate according to claim 1 wherein at least one face of said polycarbonate lamina or said thermoplastic resinous laminae which is bonded to said adhesive interlayer is primed with a polydiorganosiloxane-polycarbonate block copolymer composition.

4. A laminate according to claim 1 wherein at least one face of said polycarbonate lamina or thermoplastic resinous laminae is coated with a cross-linked mar and plasticizer resistant coating.

5. A laminate according to claim 4 wherein at least one external face has a cross-linked mar-resistant coating.

6. The laminate according to claim 5 wherein said back polycarbonate lamina has a protective coating from about 0.05 to about 1 mils thick, which coating is relatively more brittle than the underlying polycarbonate lamina.

7. A laminate according to claim 1 wherein said thermoplastic resinous laminae are selected form the group consisting of polycarbonates, polyacrylates, and polymethacrylates.

8. A laminate according to claim 1 wherein the laminate is symmetrical about said internal strengthened glass lamina and has outer lamina of polycarbonate.

9. A laminate according to claim 8 wherein said glass lamina is bonded on two sides to thermoplastic resinous laminae of polyacrylate or polymethacrylate.

10. The laminate according to claim 1 wherein said adhesive interlayers are comprised of a polydiorganosiloxane-polycarbonate block copolymer.

11. The laminate according to claim 1 which has the structure A/B/C/B'/A' wherein A is said back polycarbonate lamina, A', B' and B are independently selected from thermoplastic resinous laminae, and C is said glass lamina.

12. The laminate according to claim 11 wherein A' is a polycarbonate lamina and B and B' are independently selected from polyacrylate or polymethacrylate laminae.

* * * * *